Patented Nov. 11, 1952

2,617,730

UNITED STATES PATENT OFFICE 2,617,730

CHEESE-MILK FAT FOOD PRODUCT AND METHOD OF PRODUCING THE SAME

Henry F. Long and James S. Erickson, Danville, Ill., assignors to Sugar Creek Creamery Company, Danville, Ill., a corporation of Delaware No Drawing. Application March 30, 1950, Serial No. 153,002

14 Claims. (Cl. 99—117)

The present invention relates to an edible plastic substance having good nutritive properties and useful in connection with the preparation of foods for the table and for use as a spread in much the same manner as butter is used.

More particularly, the invention relates to a food product of the above general character, wherein cheese is utilized as a substantial ingredient and in such fashion that the flavor, consistency, and keeping qualities may be preserved and enhanced over those present in products of this general character now available.

Another object of the invention is to provide a process and product by means of which soft uncured cheese, together with milk fat, may be utilized as the principal ingredients of a food product having good consistency and smoothness, with excellent nutritive and keeping properties, and having an odor, taste and appearance similar to butter.

In carrying out this invention, the soft uncured cheese and milk fat, together with other ingredients to stabilize and flavor the composition, are compounded in such fashion that, after mixing and treatment, the milk fat ingredient of the composition is in a continuous phase with the remaining ingredients thereof in a discontinuous phase. The ultimate product possesses a high ratio of milk solids not fat to fat and is found to be highly acceptable for use in cooking, baking and as a table spread.

In order to avoid an undesirably sweet flavor in the ultimate product, it is essential, in accordance with the present invention, to use a soft uncured cheese such as cottage cheese or other similar acid or rennet coagulated skim milk product which is relatively free from lactose. As a source of fat, cream or plastic (high fat) cream, or other edible fats, either animal or vegetable in origin, may be used.

With the cheese and fat above mentioned, a small amount of milk solids are utilized to take up some of the water of the composition, and also to impart some flavor thereto. The milk solids used may be skim milk powder, concentrated skim milk, dried sweet cream buttermilk, dried whole milk powder, concentrated whole milk, or delactosed skim milk powder or concentrate. The fat in dried whole milk powder and concentrated whole milk would supplant part of the fat from cream in the formulation of the product.

In order to impart a suitable body to the composition, a stabilizer is utilized, this stabilizer being any of numerous available animal or vegetable products, such as gelatin or a number of the alginates. Included within the composition of the stabilizer may be suitable emulsifiers such, for example, as modified stearate sugars, polyoxy ethylene stearate, lecithin, and other known emulsifiers now in common use.

One form of stabilizer that has been found to be satisfactory in the above described product, is the product sold by the Kelco Company of New York city, called "Dricoid," which is a phosphated sodium alginate, a modified stearate sugar (polyoxy ethylene stearate) and dextrin.

The foregoing ingredients, with salt and water, are compounded to form the spread by reducing the cheese in water to a fine consistency by milling, for example, in a colloid mill. This mixture is heated to a temperature of 90° F., and it is substantially neutralized (pH 6.6 to 7.0) by the addition of a dilute alkali, such as 5% to 10% sodium hydroxide. The milk solids, stabilizer and salt are mixed with the neutralized cheese in the colloid mill to secure a smooth consistency. The resulting mixture is pasteurized in any suitable fashion as, for example, by heating to 145° F. for 30 minutes.

The fat ingredient of the resulting product is pasteurized separately at the temperature and for the time above stated, and is added to the above described mixture. The entire mixture is mixed and chilled to about 44 or 45° F., while being passed through a machine such as a continuous ice cream freezer. This operation requires rapid cooling with agitation in order that a solid plastic product may be obtained.

The proportions of the several ingredients of the new product are susceptible to considerable variation as indicated in the following table:

| | Per cent |
|---|---|
| Cottage cheese | 25.0 to 35.0 |
| Skim milk solids | 1.0 to 2.0 |
| Milk fat | 35.0 to 45.0 |
| Salt | 1.0 to 3.0 |
| Stabilizer | 1.0 to 2.0 |
| Water | 20.0 to 30.0 |

A preferred formulation in accordance with the present invention is as follows:

| | Per cent |
|---|---|
| Cottage cheese | 29.0 |
| Skim milk solids | 1.4 |
| Milk fat | 40.0 |
| Salt | 2.0 |
| Stabilizer | 1.7 |
| Water | 25.9 |
| | 100.0 |

An example of one method by which the desired food product may be manufactured comprises weighing the several ingredients in accordance with the formula above stated. The calculated amount of water is added to the cottage cheese, and the cheese is reduced to a fine consistency by milling in a colloid mill as aforesaid. This cheese mixture is then brought to a temperature of 90° F., and its pH adjusted to 6.8 by the addition of sodium hydroxide. The skim milk solids, stabilizer, and salt are mixed with the neutralized cheese by pouring each into the colloid mill at such a rate that the liquid washes the powdered mixture through the cheese mixture, and an immediate dispersion of the solids is accomplished, thus preventing the formation of lumps in the finished product.

The cheese mixture and the fats are pasteurized separately at 145° F. for about 30 minutes, the cheese mixture being then cooled to about 116° F., and the fat product to about 102° F. If desired, diacetyl is added at this point. Just prior to final chilling, the two portions are mixed with as little agitation as possible to avoid forming an emulsion at this point. This step is most important in the production of a product having the desired physical characteristics. It has been found that where the fat is emulsified with the cheese mixture in such manner that the fat is in a discontinuous phase, the ultimate product resembles mayonnaise.

The product is then reduced to about 44 to 45° F., in a continuous ice cream freezer equipped with a solid mutator or rotor running at approximately 600 R. P. M. and having a capacity of 500 pounds per hour.

In certain instances, it is found to be of advantage to work the product after the final chilling operation and as it issues from the freezer, in order to impart a finer texture thereto. For example, the working may be accomplished by forcing the product under pressure through one or more apertures. In any event, the final product carries the fat content in a continuous phase, which results in the product having a fat flavor rather than a milk solids flavor.

In order that the fat may set up rapidly to form the foregoing structure, it must be cooled rapidly, otherwise it will separate out. It is to be observed that the speed of the rotor of the continuous freezing machine may be increased, in which case the final temperature to which the product is lowered may be somewhat higher than the temperature above specified. For example, in a so-called "Votator" having a 4-inch tube and in which the rotor is formed with two blades, the speed may be increased from a normal speed of 700 R. P. M. to a speed of 800 R. P. M. In a freezer of the same type formed with four blades instead of two, the speed may be 750 R. P. M. and, in each of the above cases, the final temperature may be from 52 to 58° F., rather than from 44 to 45° F., as above specified.

It has also been found that it is of advantage to limit the air content of the ingredients during the operation inasmuch as air will tend to give a crumbly body to the final product. Accordingly, a vacuum (23 to 24 inches of mercury) may be pulled momentarily on the ingredients in a vacuum pan.

We claim:

1. A solid plastic food product, having a smooth texture and flavor similar to butter, comprising a homogeneous fat emulsion of a soft uncured cheese, water, milk solids, an edible fat, and a stabilizer in which the fat is present in a continuous phase, and the remaining ingredients thereof in a discontinuous phase.

2. A solid plastic food product, having a smooth texture and flavor similar to butter, comprising a homogeneous fat emulsion of the following ingredients in the following proportions:

| | Per cent |
|---|---|
| Soft uncured cheese | 25.0 to 35.0 |
| Skim milk solids | 1.0 to 2.0 |
| Edible fat | 35.0 to 45.0 |
| Salt | 1.0 to 3.0 |
| Stabilizer | 1.0 to 2.0 |
| Water | 20.0 to 30.0 | and in which the fat is present in a continuous phase, and the remaining ingredients thereof in a discontinuous phase.

3. A solid plastic food product, having a smooth texture and flavor similar to butter, comprising a homogeneous fat emulsion of the following ingredients in the following proportions:

| | Per cent |
|---|---|
| Cottage cheese | 29.0 |
| Skim milk solids | 1.4 |
| Milk fat | 40.0 |
| Salt | 2.0 |
| Stabilizer | 1.7 |
| Water | 25.9 | and in which the fat is present in a continuous phase, and the remaining ingredients thereof in a discontinuous phase.

4. The method of manufacturing a solid plastic food product having a smooth texture and flavor similar to butter comprising, mixing, in any order, a soft substantially neutral uncured cheese, water, milk solids, and a stabilizer to form a smooth homegeneous mass, pasteurizing such mass, separately pasteurizing an edible fat, and then mixing the mass and fat with a minimum of agitation and immediately chilling with agitation to form an emulsion in which the fat is present in a continuous phase, and the remaining ingredients thereof in a discontinuous phase.

5. The method of manufacturing a solid plastic food product having a smooth texture and flavor similar to butter comprising, mixing, in any order, a soft substantially neutral uncured cheese, water, milk solids, and a stabilizer to form a smooth homogeneous mass, pasteurizing such mass, separately pasteurizing milk fat, and then mixing the mass and fat with a minimum of agitation and immediately chilling with agitation to form an emulsion in which the fat is present in a continuous phase, and the remaining ingredients thereof in a discontinuous phase.

6. The method of manufacturing a solid plastic food product having a smooth texture and flavor similar to butter comprising, mixing, in any order, a soft substantially neutral uncured cheese, water, milk solids, and a stabilizer to form a smooth homogeneous mass, pasteurizing such mass, separately pasteurizing an edible fat, and then mixing the mass and fat with a minimum of agitation and immediately chilling with agitation to a temperature of from 40 to 60° F. to form an emulsion in which the fat is present in a continuous phase, and the remaining ingredients thereof in a discontinuous phase.

7. The method of manufacturing a solid plastic food product having a smooth texture and flavor similar to butter comprising, mixing, in any order, substantially neutral cottage cheese, water, milk solids, and a stabilizer to form a smooth homogeneous mass, pasteurizing such mass, separately pasteurizing milk fat, and then mixing the mass and fat with a minimum of agitation and immediately chilling with agitation to form an emulsion in which the fat is present in a continuous phase, and the remaining ingredients thereof in a discontinuous phase.

8. The method of manufacturing a solid plastic food product having a smooth texture and flavor similar to butter comprising, mixing a soft substantially neutral uncured cheese with water to form a smooth homogeneous mass, adding thereto milk solids and a stabilizer to disperse the said solids and stabilizer evenly in the mass, pasteurizing the mass, separately pasteurizing an edible fat, and then mixing the mass and fat with a minimum of agitation and immediately chilling with agitation to form an emulsion in which the fat is present in a continuous phase, and the remaining ingredients thereof in a discontinuous phase.

9. The method of manufacturing a solid plastic food product having a smooth texture and flavor similar to butter comprising, mixing a soft uncured cheese with water to form a smooth homogeneous mass, heating and adjusting the pH of the mass to from 6.6 to 7.0, dispersing evenly thereinto milk solids, a stabilizer and salt, pasteurizing the mass, separately pasteurizing an edible fat, and then mixing the mass and fat with a minimum of agitation and immediately chilling with agitation to form an emulsion in which the fat is present in a continuous phase, and the remaining ingredients thereof in a discontinuous phase.

10. The method of manufacturing a solid plastic food product having a smooth texture and flavor similar to butter comprising, mixing a soft uncured cheese with water to form a smooth homogeneous mass, heating and adjusting the pH of the mass to from 6.6 to 7.0, dispersing evenly thereinto milk solids, a stabilizer and salt, pasteurizing the mass, separately pasteurizing an edible fat, cooling the cheese mass to about 116° F., cooling the fat to about 102° F., and then mixing the mass and fat with a minimum of agitation and immediately chilling with agitation to form an emulsion in which the fat is present in a continuous phase, and the remaining ingredients thereof in a discontinuous phase.

11. The method of manufacturing a solid plastic food product having a smooth texture and flavor similar to butter comprising, mixing cottage cheese with water and forming a smooth homogeneous mass, adjusting the pH of the mass to from 6.6 to 7.0, adding thereto milk solids and a stabilizer to disperse the said solids and stabilizer evenly in the mass, pasteurizing the mass, separately pasteurizing a milk fat, and then mixing the mass and fat with a minimum of agitation and immediately chilling with agitation to form an emulsion in which the fat is present in a continuous phase, and the remaining ingredients thereof in a discontinuous phase.

12. The method of manufacturing a solid plastic food product having a smooth texture and flavor similar to butter comprising, mixing cottage cheese with water and forming a smooth homogeneous mass, adjusting the pH of the mass to from 6.6 to 7.0, adding thereto milk solids and a stabilizer to disperse the said solids and stabilizer evenly in the mass, pasteurizing the mass, subjecting the aforesaid ingredients to a vacuum to remove air therefrom, separately pasteurizing a milk fat, and then mixing the mass and fat with a minimum of agitation and immediately chilling with agitation to form an emulsion in which the fat is present in a continuous phase, and the remaining ingredients thereof in a discontinuous phase.

13. The method of manufacturing a solid plastic food product having a smooth texture and flavor similar to butter comprising, mixing, in the following percentages by weight, 25 to 35% cottage cheese with 20 to 30% of water and forming a smooth homogeneous mass thereof, adjusting the pH of the mass to from 6.6 to 7.0, evenly dispersing in the mass 1 to 2% of skim milk solids, 1 to 2% of a stabilizer and 1 to 3% salt, pasteurizing the aforesaid mass, separately pasteurizing 35 to 45% of a milk fat, and then mixing the mass and fat with a minimum of agitation and immediately chilling with agitation to form an emulsion in which the fat is present in a continuous phase, and the remaining ingredients thereof in a discontinuous phase.

14. The method of manufacturing a solid plastic food product having a smooth texture and flavor similar to butter comprising, mixing, in the following percentages by weight, 25 to 35% cottage cheese with 20 to 30% of water and forming a smooth homogeneous mass thereof, heating to 90° F., and adjusting the pH to about 6.8, evenly dispersing in the mass 1 to 2% of skim milk solids, 1 to 2% of a stabilizer and 1 to 3% salt, pasteurizing the aforesaid mass, separately pasteurizing 35 to 45% of a milk fat, and then mixing the mass and fat with a minimum of agitation and immediately chilling with agitation to form an emulsion in which the fat is present in a continuous phase, and the remaining ingredients thereof in a discontinuous phase.

HENRY F. LONG.
JAMES S. ERICKSON.

REFERENCES CITED

The following references are of record in the file of this patent:

UNITED STATES PATENTS

| Number | Name | Date |
|---|---|---|
| 2,009,136 | Grelck | July 23, 1935 |
| 2,015,258 | Clickner | Sept. 24, 1935 |

FOREIGN PATENTS

| Number | Country | Date |
|---|---|---|
| 3,240 | Great Britain | A. D. 1879 |
| 30,919 | Great Britain | A. D. 1897 |